Nov. 14, 1939.    L. THIBOUST    2,179,905
CALCULATING DEVICE
Filed May 26, 1936    4 Sheets-Sheet 1
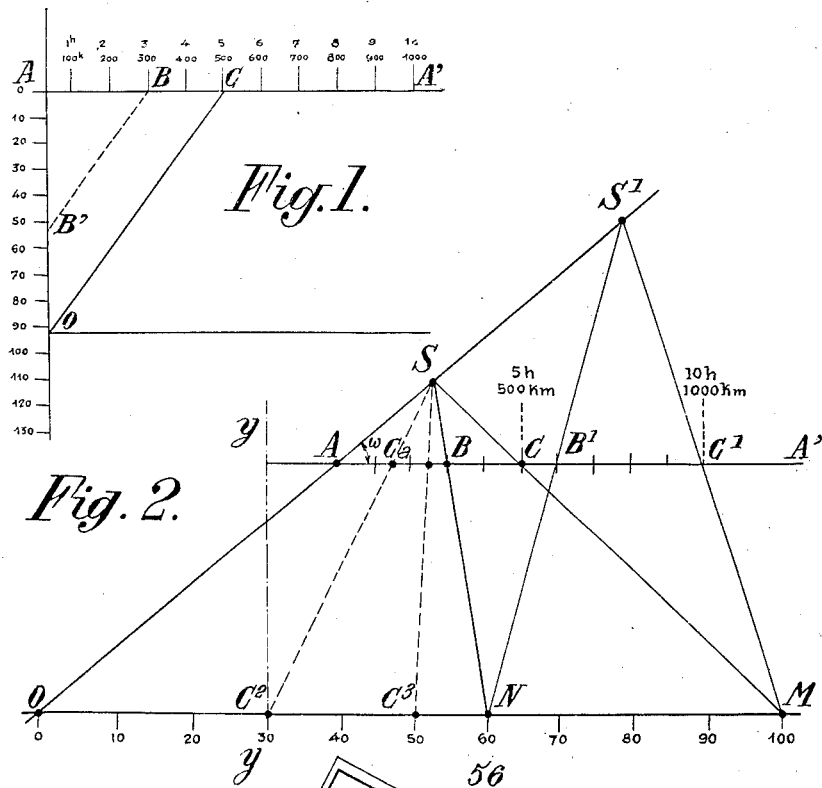
Fig. 1.
Fig. 2.
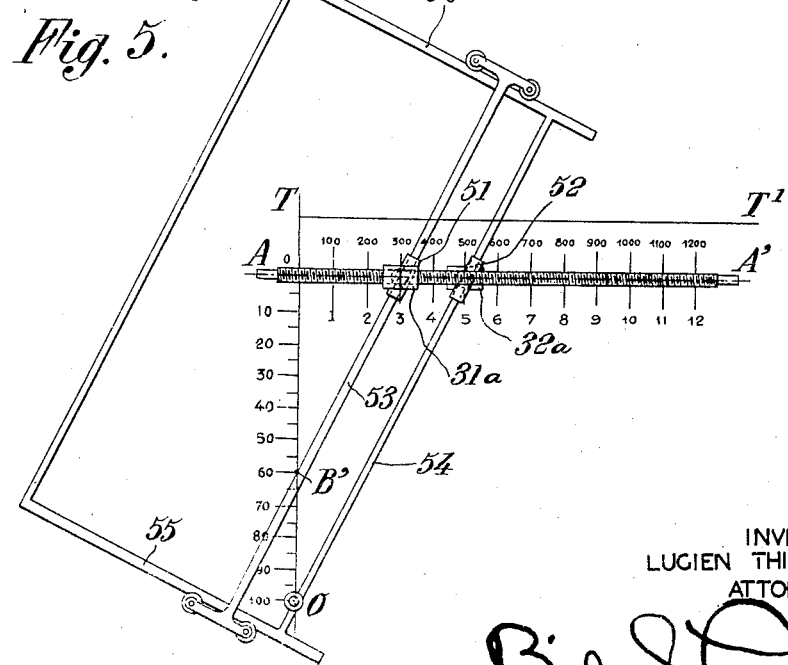
Fig. 5.
INVENTOR
LUCIEN THIBOUST
ATTORNEYS Nov. 14, 1939.    L. THIBOUST    2,179,905
CALCULATING DEVICE
Filed May 26, 1936    4 Sheets-Sheet 2

INVENTOR
LUCIEN THIBOUST
ATTORNEYS

Nov. 14, 1939.　　　L. THIBOUST　　　2,179,905

CALCULATING DEVICE

Filed May 26, 1936　　　4 Sheets-Sheet 3

INVENTOR
LUCIEN THIBOUST

ATTORNEYS

Nov. 14, 1939.    L. THIBOUST    2,179,905
CALCULATING DEVICE
Filed May 26, 1936    4 Sheets-Sheet 4

Inventor:
Lucien Thiboust
by Bailey & Larson
Attys.

Patented Nov. 14, 1939

2,179,905

UNITED STATES PATENT OFFICE 2,179,905

CALCULATING DEVICE

Lucien Thiboust, Paris, France

Application May 26, 1936, Serial No. 81,943
In Belgium October 2, 1935

12 Claims. (Cl. 235—61)

This invention relates to devices for indicating continuously the ratio or quotient of two independently variable quantities, as, for example, the average speed of road, rail or other vehicles.

The main purpose of the invention is to simplify the construction of said devices and to make their operation more positive and more accurate.

The principal object of my invention is to provide a device for indicating continuously the ratio between two independently variable quantities comprising means for materializing two geometrical points movable, in the same direction along a common axis, or along parallel axes, means for displacing one of said geometrical points, with respect to a common origin by a length proportional to one of said variable quantities, and the other geometrical point by a length proportional to the other of said variable quantities, and physical means for materializing straight lines forming geometrically similar triangles continuously projecting said displacements of said geometrical points on a common line, a scale being preferably associated with said common line to give direct readings of the ratio of said variables.

Another object of my invention is to provide a device of the type referred to, in which the physical means used to project, by geometrically similar triangles, said displacements of said geometrical points upon a common line, consist of interconnected linkage means.

Further objects and advantages of my invention will appear to one skilled in the art from the following description, with reference to the accompanying drawings, it being understood, however that said description and drawings are given mainly by way of example, and are not to be construed as limiting the scope of the invention.

In these drawings:

Fig. 1 shows a geometric diagram illustrating the general principle of the device.

Fig. 2 shows a second diagram referring more particularly to the embodiment illustrated in Figs. 3, 4, 6, 7 and 8.

Fig. 5 shows a plan view of an embodiment of the principle illustrated in Fig. 1.

Figure 3:
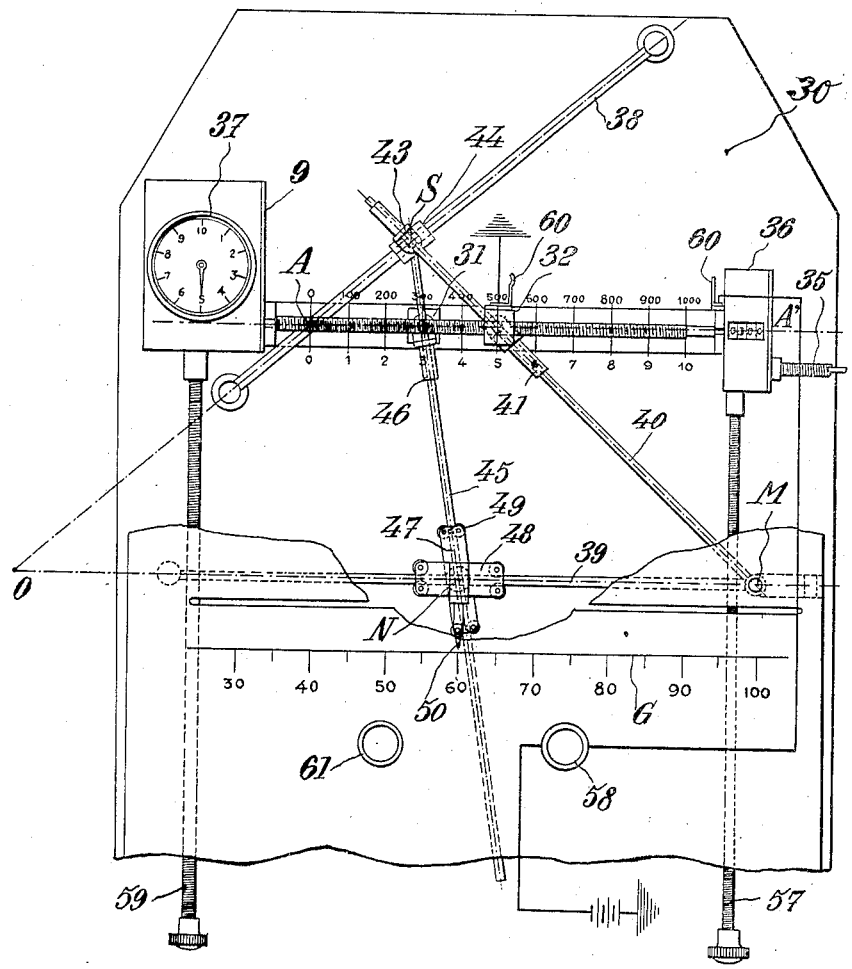
Fig. 3 shows a plan view of one embodiment of the principle illustrated in Fig. 2.
Figure 4:
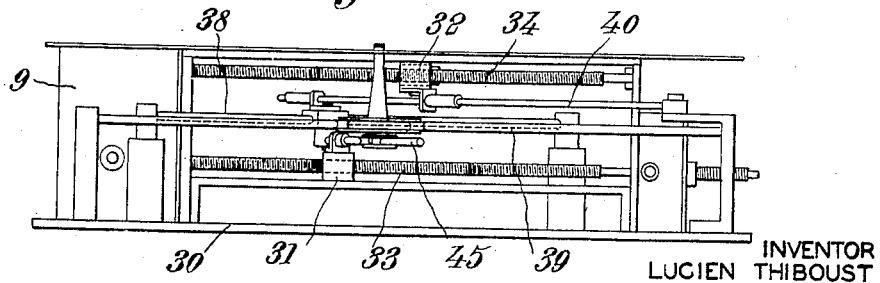
Fig. 4 shows a cross-section of the same embodiment.

According to my invention, I provide physical means for projecting, upon a common line suitably located, two lengths each proportional to one of the variables whose ratio it is desired to indicate continuously.

To this end, I provide means for plotting continuously along a common axis AA', or parallel axes, two lengths AB and AC, starting at a common origin A, the first being continuously proportional to the variable which is the numerator of the required ratio, as, for example, the distance travelled, in case of average speed indicators, the second being continuously proportional to the variable which is the denominator of said ratio, as, for example, the time, in the above case. I then provide means for projecting upon a common base line, OA in Fig. 1, OM in Fig. 2, said lengths AB and AC, by means of geometrically similar triangles, in such a manner that the length homologous to AC remains constant, and that homologous to AB varies proportionally to the ratio $$\frac{AB}{AC}$$

I attain this end, as shown in Fig. 1, by connecting point C with a fixed point O on the common base line, and drawing through B a parallel BB' to OC. Triangles B'AB and OAC being similar, we have the relation $$\frac{AB'}{AO} = \frac{AB}{AC}$$

which is the ratio required. AO being chosen of constant length, a scale may be plotted along said line and graduated so that the segment AB' gives directly the value of the ratio in terms of the two variable quantities.

For example, in the special case of an average speed indicator, wherein AB is proportional to the distance travelled by the vehicle, and AC to the time lapsed since it started, the scale graduations may be chosen such that AO represents 100 miles, or any other convenient value, and AB' reads directly, in miles per hour, the ratio of the distance measured in miles to the time measured in hours.

In Fig. 2, I show a similar method, whereby I choose a common base line OM, parallel to the axis AA' upon which I plot the lengths AB and AC; and I form geometrically similar triangles by joining O and A, M and C, said lines intersecting at S; and finally by joining S and B, said line continued intersecting the base line OM at N. Triangles ASB and OSN being similar, and ASC and OSM likewise, we have the following relation:

$$\frac{ON}{OM} = \frac{AB}{AC}$$

which is the ratio required.

For any other values of the variables corresponding to $AB_1$ and $AC_1$, the apex S of the similar triangles will move to $S_1$, and the ratio indicated will be $$\frac{AB_1}{AC_1} = \frac{ON}{OM}$$

For the special case of an average speed indicator, a scale may be plotted along the base line OM and graduated, for example, so that OM represents 100 miles. The segment ON then gives directly the value of the ratio in miles per hour.

In order to reduce the size of the instrument, it is possible to omit the portion of the diagram indicating average speeds that are not curent in practice. For example, if the vehicle always travels at an average speed superior to 30 miles per hour, the portion to the left of line $y$—$y$ in Fig. 2 may be omitted. Under these conditions, the actual lengths projected on the base line will be $CaB$, homologous to $C^2N$, and $CaC$, homologous to $C^2M$.

It is to be noted that the choice of the common base lines, OA in Fig. 1 and OM in Fig. 2 and also that of the fixed line OS, is immaterial. Furthermore, the fixed point M need not be placed at the scale division indicating 100, and could just as well be placed at any other point on said scale, such as $C^2$, $C^3$ or others, respectively indicating a value 30, 50 or otherwise for the ratio desired.

The practical application of the above described principles may be effected in many ways.

Insofar as concerns the diagram indicated by Fig. 2, one embodiment of my invention, applied specifically, for the purpose of demonstration, to the case of an average speed indicator, may be realised as illustrated by Fig. 3. On a base plate 30, I provide means for displacing two movable rider members 31 and 32, respectively materializing geometrical points B and C in the diagram of Fig. 2, in the same direction and along a common line AA', or along two parallel lines lying in a plane perpendicular to said base plate 30, the travel of rider member 31, for example, measured from an origin A, being proportional to the variable forming the numerator of the required ratio, as, for example, the distance travelled by the vehicle, in the case of an average speed indicator, and the travel of rider member 32, measured from the same origin A, being proportional to the variable forming the denominator of said ratio, as for example, the time. A convenient means of accomplishing this purpose consists in mounting on said base plate 30, in a plane perpendicular to said base plate, two parallel screw-threaded rods 33 and 34, one of which, for example 33, is caused to rotate in proportion with the numerator variable, and the other, for example 34, in proportion with the denominator variable.

In an average speed indicator, the threaded rod 33 would be connected to the mileage indicator of the vehicle, by means of a flexible drive 35, and the threaded rod 34 to a clock. Rod 33 operates a threaded rider member 31, and rod 34 a similar rider member 32. Optionally, the mileage indicator 36 may be directly connected to the end of threaded rod 33, and a clock 37 to the end of rod 34. A fixed guiding member 38 materializes line OAS on the diagram of Fig. 2, upon which guiding member is slidably mounted a freely slidable independent rider member 43, materializing the apex S of the similar triangles; and a second fixed guiding member 39 materializes the common base line OM, upon which it is proposed to project the respective displacements of riders 31 and 32. The projection of point C on said common base line is effected by means of a rotatable link member 40, pivoted to a fixed point at M, and rotatably and slidably connected to the denominator rider member 32 by means of a sleeve 41 pivoted to said rider 32, and to the independent rider 43, rotatably connected to a sleeve 44.

The projection of point B of the diagram of Fig. 2 onto the common base line, is effected by means of a second link member 45, rotatably connected to the independent rider 43, and pivotally and slidably connected to the numerator rider member 31 by means of a sleeve 46 pivoted to said rider 31, and also optionally connected, pivotally and slidably, to a rider member 49 bearing the index 50, for example by means of two sleeves 47 and 48 respectively slidably mounted on said link member 45 and said guiding member 39, said sleeves 47 and 48 being rotatably interconnected. Optionally, I provide roller bearing means such as 49, to reduce friction between said parts and said riders.

An extremely important condition is that the numerator and denominator rider members, 31 and 32, and the independent rider member 43 be so constructed that the geometric points B, C and S which they materialize, and which are respectively located on their respective centers of rotation, may be accurately superimposed on the same imaginary line erected at the origin A perpendicularly to the base plate 30; for at the origin of the variables, for example when the vehicle starts its motion, the points B, C and S all three coincide with the origin A. One particular solution of this problem has been indicated in Figs. 6 and 7.

The ratio of the two variables may be indicated directly by means of an index or pointer 50 on a scale G parallel to the base line OM; or said indicating rider member 49 may be connected, by means of suitable mechanical or electrical means, to operate an index located at a certain distance from the ratio indicating device.

The numeral 57 designates a spindle through whose rotation the spindles 33 and 34 carrying the runners 31 and 32 can be shifted into a direction such that the runners are moved back into their starting positions. Spindle 59 serves to wind the clockwork 37. Two contacts 60, one of which is carried by the runner 32, and the other by the stationary frame of the apparatus, come in contact with each other when the runner 32 reaches the end of its course. A circuit is closed in this manner in which a lamp 58 is interposed, so that the latter is illuminated and thus gives a warning signal which tells the operator that the indicating apparatus must be cut off.

The clock 37 is provided with a dial which is subdivided into only ten hours, as this clock does not show the time of day but merely indicates the number of hours elapsed since the beginning of the operation of the device.

Insofar as concerns the geometric diagram illustrated by Fig. 1, a device embodying this principle may be constructed as shown in Fig. 5. As in the previous case, I provide two parallel screw-threaded rods lying in a plane perpendicular to the base plate of the instrument; and I mount thereon two screw-threaded rider members 31a and 32a, 31 being operated, as in the previous case, by the numerator variable, for example the distance of travel, in the case of an average mileage indicator, and 32a being operated by the denominator variable, as, for example, the time, in the same case.

In this embodiment of my invention, the scale may conveniently be set at a suitable angle, for example 90°, to the axes of the screw-threaded rods. The projection of point C, materialized by the denominator rider member 32a onto said scale G is effected by means of a first link member 54 pivoted to a fixed point at O and rotatably and slidably connected to said denominator rider member 32a, by means of a sleeve 52 pivoted to rider member 32a.

The projection of point B, materialized by the numerator rider member 31a, onto said scale G is effected by means of a second link member 53, rotatably and slidably connected to said numerator rider member 31a, by means of a sleeve 51 pivoted to rider member 31a, said link being maintained, by any known means, in parallel relation with link member 54. By way of example, I have indicated one method of insuring said parallel relation between links 53 and 54, consisting of a rigid frame of link members secured to link 54, and comprising two perpendicular guiding members 55 and 56 upon which travel the ends of said link member 53, said ends being provided with T members and rollers as indicated. Of course, any other type of parallel motion mechanism could have been substituted therefor.

It is to be noted also that one or the other of said rider members could have been made to travel along a line other than AA', as, for example, along TT', without interfering with the accuracy of the indications of the device.

Figure 6:
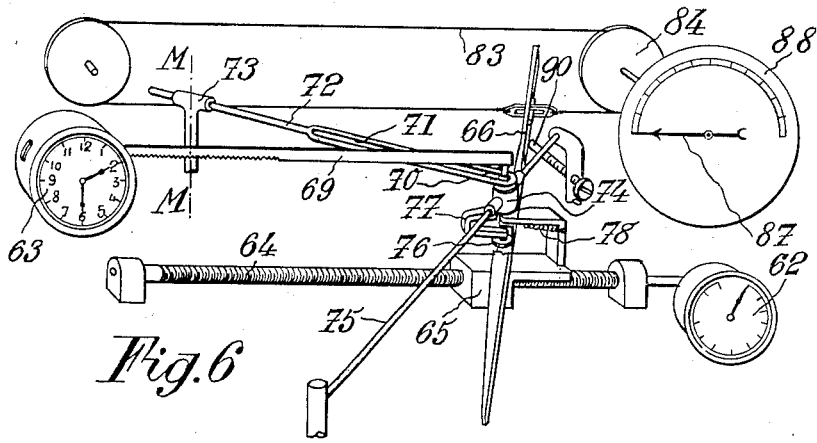
Fig. 6 shows a perspective view of an improved embodiment of the principle illustrated in Fig. 2.
Figure 7:
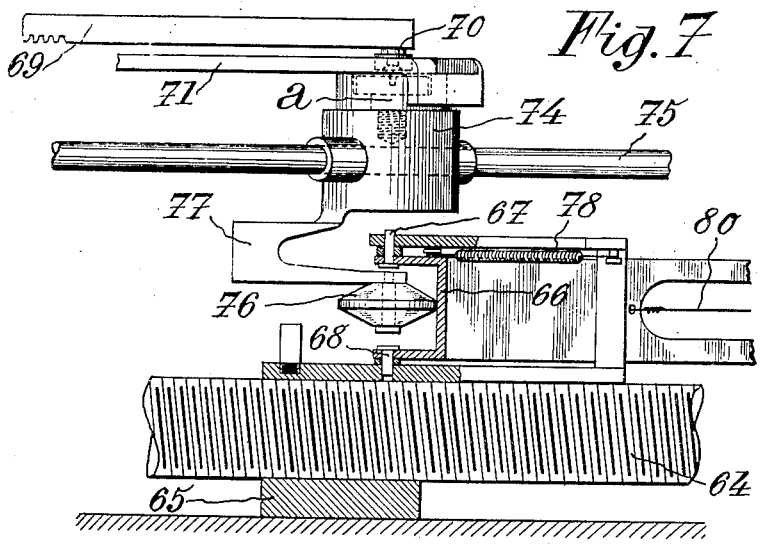
Figs. 7 and 8, show in cross-sectional elevation, two detail views of the mechanism illustrated in Fig. 6.
Figure 8:
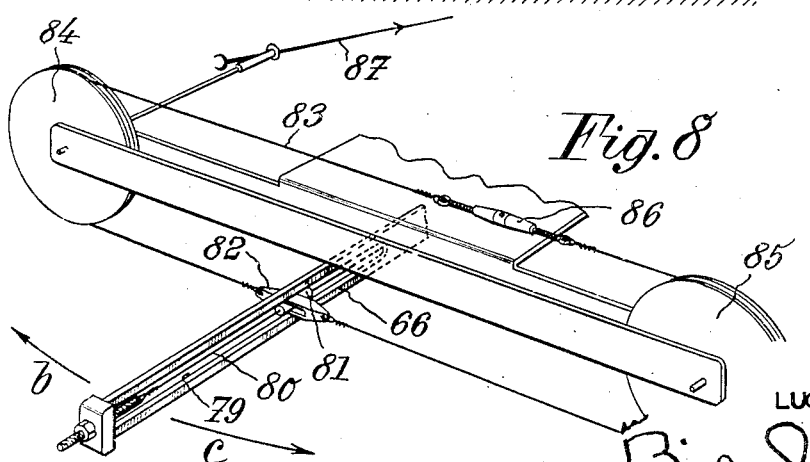

Insofar as concerns the structural details of my invention, I have indicated in Figs. 6, 7 and 8 an embodiment which has proved exceptionally satisfactory, particularly insofar as concerns the necessary coincidence of the four points A, B, C and S at the origin of time and distance, which position of said points is shown in Fig. 6, the means provided therein for transmitting the motion of the index link member 45 to a circular dial, for greater convenience in mounting in relatively restricted space, and improved means of operating the denominator rider member, as, for example, the time rider in an average speed indicator.

In this embodiment, which is particularly adapted to average speed indicators, I prefer to operate the time controlled rider member by means of a rack engaging a pinion driven by a clock, for the reason that I have found that it absorbs less energy than a screw-threaded rod of the required diameter and pitch. In Fig. 6, 63 shows a clock operating a rack 69, and 62 is a mileage indicator operating a screw-threaded rod 64. Said screw-threaded rod 64 operates a screw-threaded rider member 65 which moves parallel to rod 64. Rack 69 is mounted parallel to rod 64 and moves a pivot member 70 which is free to slide in a slot 71 formed in the link member 72, which link member 72 materializes line SM in Fig. 2. Line AS is materialized by a fixed guiding member 75, upon which is slidably mounted an independent rider member 74, which materializes point S. Link member 72 is pivoted at a, Fig. 7, to said rider member 74, and is rotatably and slidably connected to a pivoted sleeve 73 materializing point M on the diagram.

The time-projecting line SBN is materialized by a rotatable link member 66 pivoted at 67 and 68 to the distance rider member 65, which rider member bears a forked member for that purpose. Finally, the connection between the independent rider member 74 which materializes point S is effected by means of a roller 76 pivoted to said independent rider member 74, which roller 76 runs in a channel-shaped groove formed in said link-member 66 for that purpose, a helical spring 78 being provided between said link member 66 and said rider member 65, to maintain said link member in continual contact with said roller 76.

Figure 9:
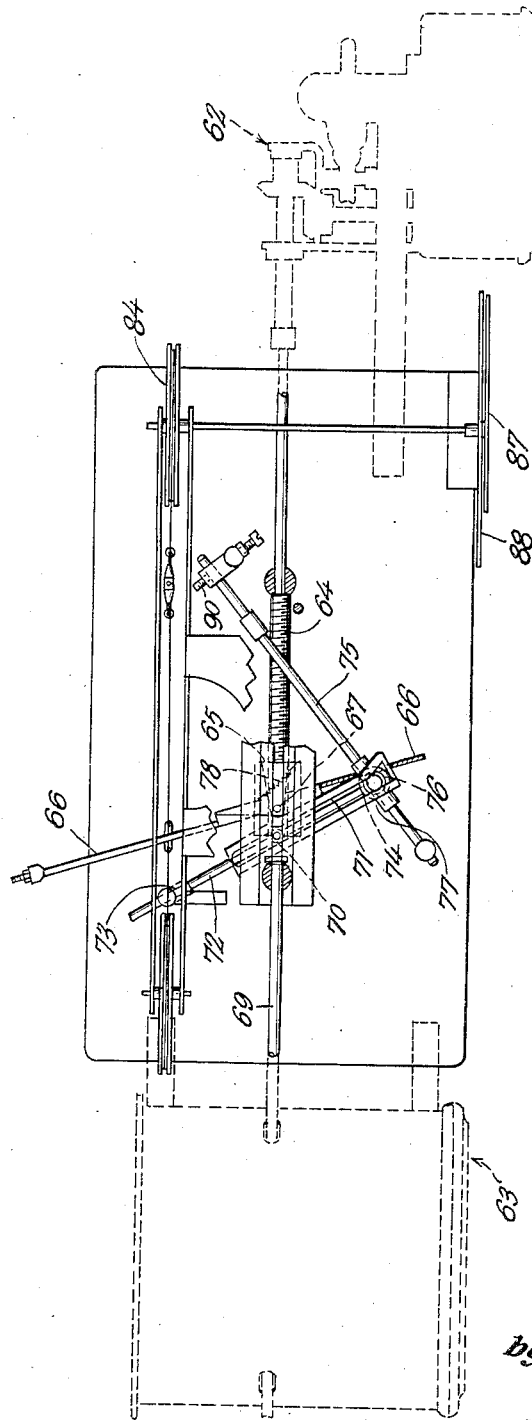
Fig. 9 is a plan view of the mechanism of Fig. 6, the moving members being displaced from their position in Fig. 6.

In order to satisfy the requirement of absolute coincidence of points A, B, C and S at the origin of time and distance, said roller 76 is carried on the lower branch of a hair-pin arm 77 integral with said independent rider member 74, materializing point S, and said link member 66, materializing line SBN is pivoted, as described above, in a forked support member integral with said distance rider member 65. The device is shown in Figs. 6 and 7 at the zero point, that is, at the origin of time and distance, and it may be readily seen that pivot 70, materializing point C, pivot a and the axis of roller 76, materializing point S, and pivots 67 and 68, materializing point B, are all in perfect coincidence on a vertical axis which indicates the origin A. Fig. 9 illustrates the same elements moved from the zero position of Fig. 6, that is the pivot 70 no longer lies over the axis 76 and pivots 67 and 68.

In order to facilitate the reading of the average speed, I prefer to transform the rectilinear translation of the end of link member 66 moving in the directions b and c, materializing point N on the diagram, into rotary motion of an index 87 before a circular dial bearing a graduated scale 88. For this purpose, I have provided a pair of pulleys 84 and 85 over which passes a stretched wire 83, maintained in tension by a turnbuckle 86; and I secure said link member 66 to said wire 83 by means of a yoke member 82, slidable within a slot 79 in said link member 66, said yoke member 82 comprising a rotatable sleeve 81 through which passes a stretched wire 80 held centrally in said slot 79, hence secured to said link member 66. In this manner, said link member 66 may slide axially and rotate with respect to said wire 83, but necessarily communicates to said wire the displacements of the point N which it materializes. These displacements cause the pulleys 84 and 85 to revolve, and pulley 84 operates the index 87, thus indicating on the scale 88 the value of the ratio required, in terms of the variable quantities, distance and time.

As Figs. 6 and 7 show the points A, B, C, and S at zero position, that is, at the point of origin of time and distance, the link member 66 should lie parallel to guiding member 75 in order to simulate correctly the geometrical figure corresponding to this position. A stop 90 is provided to hold, at zero position, link member 66 at an angle to guiding member 75 as the scale 88 begins at a value greater than zero. As time passes with movement of rack 69, and no distance is travelled, rider 65 being stationary, roller 76 moves away from link member 66, and roller 76 remains separated from link 66 until the distance travelled becomes such so as to produce an average speed at least the minimum readable upon scale 88. During this time, link member 66 pivots around axis 67, 68, and 81. When the average speed becomes high enough, through movement of rider 65, contact is made between roller 76 and link 66 so that an increase in average speed will cause the link 66 to be rotated by the roller 76 about axis 67, 68, and thus translating 81.

By the above means, I have developed a device for continuously indicating the ratio between two independently variable quantities which is simple, accurate and positive in its action.

I wish it to be understood, however, that I do not desire to be limited to the exact details of construction illustrated or described, for obvious modifications thereto will occur to a person skilled in the art.

What I claim is:

1. A device for indicating continuously the ratio betwen two independently variable quantities comprising a pivoted member, movable means to displace angularly said pivoted member in response to the variations of one of said variable quantities, a second member, a second movable means parallel to said first movable means for moving said second member in response to the variations of the second of said variable quantities, and means controlled by said pivoted member for actuating said second member for varying its angular position.

2. A device for indicating continuously the ratio between two independently variable quantities comprising a pivoted member, movable means to displace angularly said pivoted member in response to the variations of one of said variable quantities, a second member, a second movable means movable parallel to said first movable means for moving said second member in response to the variations of the second of said variable quantities, an element extending transversely to both of said means, means on said element movable in response to the angular movement of said pivoted member and adapted to displace angularly said second member in response to variations of said first named variable quantity.

3. A device as in claim 1, said means to move said pivoted member and said means to move said second member consisting of rods and driving means joined to each of said rods.

4. A device as in claim 1, said means to move said pivoted member and said means to move said second member consisting of rods and driving means joined to each of said rods, said rods being vertically spaced apart, an element representing a base line in a plane other than that passing through said spaced rods, said pivoted member having its pivot in the vertical plane passing through said base line representing element.

5. A device as in claim 1, said means to move said pivoted member and said means to move said second member consisting of rods and driving means joined to each of said rods, said rods being spaced apart in a plane substantially perpendicular to the planes of movement of said pivoted and second members, an element representing a base line in a plane other than that passing through said spaced rods, said element being parallel to said rods, said pivoted member being pivotally mounted upon a supporting structure at said base line.

6. A device as in claim 1, a support having a ratio indicating element thereon, said pivoted member being pivotally connected to said support at said element, said second member being projected to intersect said element at a point indicating the ratio between said two quantities.

7. A device as in claim 2, parallel rods, said means to displace said pivoted member comprising one of said rods and said means to move said second member being mounted upon the other of said rods, a linearly extending reference line member parallel to and spaced from said rods, said pivoted member being pivotally fixed in the line of said reference line member, said second member being pivotally joined to said reference line member, and indicating means connected to said second member adapted to indicate the ratio of said quantities.

8. A device for indicating continuously the ratio between two independently variable quantities comprising a member, a carriage mounted upon said member, means to move said member to move said carriage in response to the variations in a first quantity, a second member, said second member being spaced from and parallel to said first member, means to move said second member in response to variations in a second quantity, an element extending transversely to said members, movable means mounted upon said element, a linearly extending base element parallel to and spaced from said members, a link, said link being pivoted on the line of said base element and pivotally connected to said movable means, one end of said second member being slidably mounted on said link, a second link mounted on said carriage, and means to transmit variations of said second member through said link and second link to said base element.

9. A device for indicating continuously the ratio between two independently variable quantities comprising a rod, a carriage mounted upon said rod, means to move said carriage in response to the variations in a first quantity, a rack spaced from and parallel to said rod, means to move said rack in response to the variations in a second quantity, a fixed bar extending transversely to said rack, a movable member mounted upon said bar, a linearly extending base element parallel to and spaced from said rack and said rod, a link extending between said base element and said movable member, said link being pivotally secured in the line of said base element and pivotally connected to said movable member, one end of said rack being slidably mounted on said link, a second link pivotally mounted on said carriage, said second link extending between said carriage and said base element, means to rotate said second link in response to movement of said movable member, a scale, and means to transmit the movement of said second link to said scale.

10. A device as in claim 9, said second link consisting of a channel shaped member, a yoke on said carriage, said second link being pivotally mounted in said yoke, a roller engaging said second link, U-shaped means connecting said roller to said movable member, and spring means adapted to resiliently press said channel against said roller.

11. A device for continuously indicating the ratio between two independently variable quantities comprising in combination an element movable in response to a change in one quantity, a second element movable in response to a change in a second quantity, two means movable parallel in a vertical plane for displacing said elements, respectively in the same direction upon changes in quantity, at least one of said elements being pivotally mounted upon its respective displacing means, ratio indicating means spaced from and out of the plane of said parallel means, and means to project the position of one of said elements proportionally to the position of the other of said elements upon said ratio indicating means.

12. A device for indicating continuously the ratio between two independently variable quantities comprising a pivoted member, movable means for angularly displacing said pivoted member in a first plane in response to variations of one of said variable quantities, a second member, a second movable means parallel to said first movable means for moving said second member in a second plane parallel to said first mentioned plane in response to variations of the second of said variable quantities, said first and second movable means moving in a third plane perpendicular to said first and second planes, and means controlled by said pivoted member for actuating said second member for varying its angular position.

LUCIEN THIBOUST.